Figure 1:
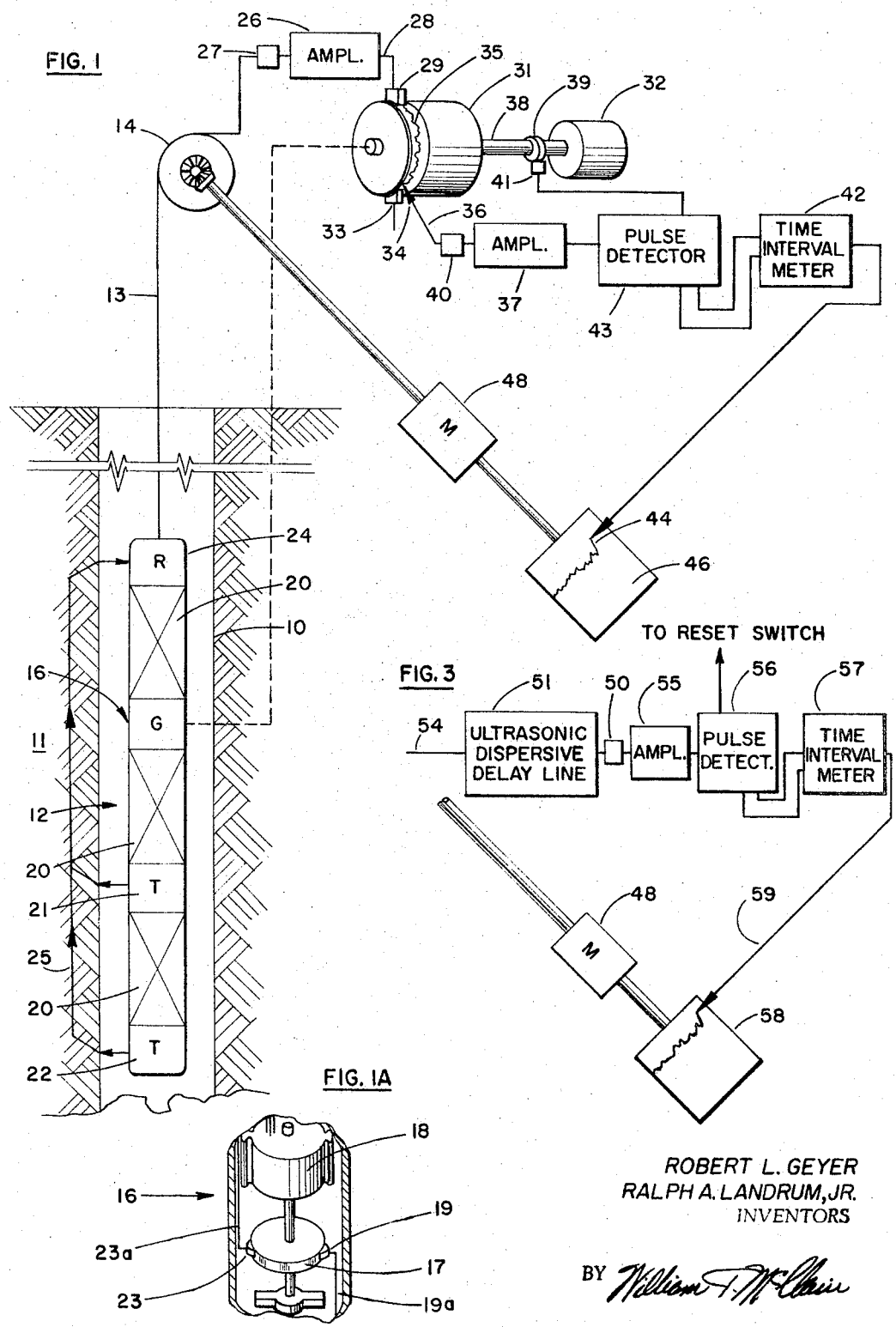

March 28, 1967

R. L. GEYER ETAL 3,311,875

ELASTIC WAVE WELL LOGGING

Filed Aug. 13, 1964

3 Sheets-Sheet 3

ROBERT L. GEYER
RALPH A. LANDRUM, JR.
INVENTORS

BY

ATTORNEY

United States Patent Office 3,311,875
Patented Mar. 28, 1967

3,311,875
ELASTIC WAVE WELL LOGGING
Robert L. Geyer and Ralph A. Landrum, Jr., Tulsa, Okla., assignors to Pan American Petroleum Corporation, Tulsa, Okla., a corporation of Delaware
Filed Aug. 13, 1964, Ser. No. 389,338
9 Claims. (Cl. 340—18)

This invention relates to measuring the velocity of propagation of elastic waves through earth formations adjacent a well bore, and more particularly it relates to acoustic well logging apparatus for substantially eliminating errors in measurement resulting from variations in the amplitudes and/or the travel paths of the waves transmitted through the earth.

In conventional acoustic well logging systems a transducer, such as a magnetostrictive oscillator, may be employed as a transmitter of elastic wave pulses in the form of wave trains of short duration and constant amplitude and frequency. Typically, the wave frequency is about 20 kilocycles per second (kc.s.) and the waves are sent in pulses about 15 to 20 times per second. One or more receivers are spaced from the transmitter along the borehole to receive waves transmitted through the earth. The time required for the waves to travel a known distance is measured to provide information regarding seismic velocity, formation porosity, or the type of fluid present in reservoir rock, as well as the degree of cement bonding to the casing, if desired. Generally, two-receiver sondes are used for seismic velocity calibration and porosity determinations, while a one-receiver instrument is employed for cement-bond logging or fracture measurements. In the two-receiver system, the time of arrival of a pulse at successive receivers, usually spaced about one foot apart, is measured, and the likelihood of error due to irregular spacing of the sonde from the surrounding media is reduced. Also, acoustic logging systems employing two pairs of transmitters and receivers have been developed to reduce error due to variations in the geometry of the well bore.

However, even with recent improvements in acoustic well logging systems, the problem of "cycle skipping" still persists. This is an effect due to the signals used, the sonde design and to variations in media being logged. Normally, in a two-receiver instrument, the receivers of the sonde are triggered by the first upward movement of the energy pulses. In certain instances the first cycle of the pulses may be too weak to trigger a receiver, and a subsequent cycle provides the triggering action. Because of the difference in the lengths of the travel paths of a wave triggering the two receivers one path may be more attenuating than another, and the two receivers are triggered by two different wave events. This gives rise to false differential arrival time measurement because of the skipped cycle, which is generally indicated by a sharp spike on the recorded log. Cycle skipping is frequently observed in fissured formations, in unconsolidated sands containing gas, and where gas-cut mud is present in a borehole.

An object of the present invention is an acoustic well logging system wherein cycle skipping is substantially eliminated.

Another object of the present invention is an acoustic logging system utilizing unique elastic wave signals to provide improved differentiation between transmitted signals and random noise.

A further object of the present invention is improved acoustic logging apparatus for use in logging cased wells.

The above and other objects of the present invention will be better understood by reference to the following description and accompanying drawings illustrative of preferred embodiments of the invention.

In accordance with the present invention, an elastic wave signal which is nonrepetitive over its duration, such as a linear swept frequency signal, is generated by a transmitter means and applied to the media surrounding a well bore for transmission to a receiver means spaced from the transmitter along the well bore. Preferably, a linear swept frequency signal is generated and recorded on a magnetic recorder employed to drive two spaced-apart transmitters and a detector receives the two signals, which are displaced by the time difference resulting from the transmitter spacing and formation velocity. The receiver output is cross-correlated with the input signal to determine the transit time and formation velocity, and, preferably, this is accomplished by passing the receiver output to a filter device matched with the signal emitted by the transmitter means.

Figure 2:
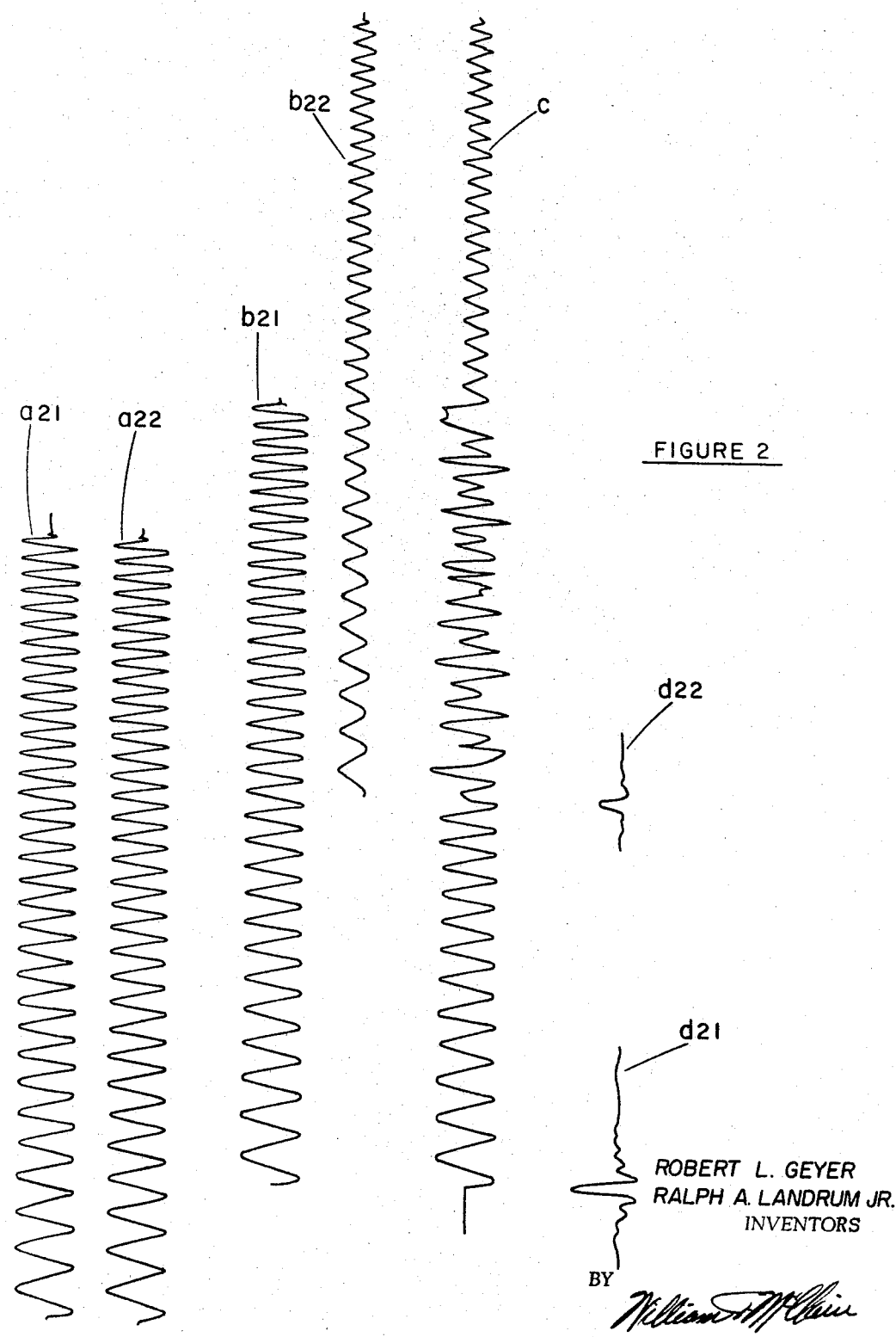
Figure 4:
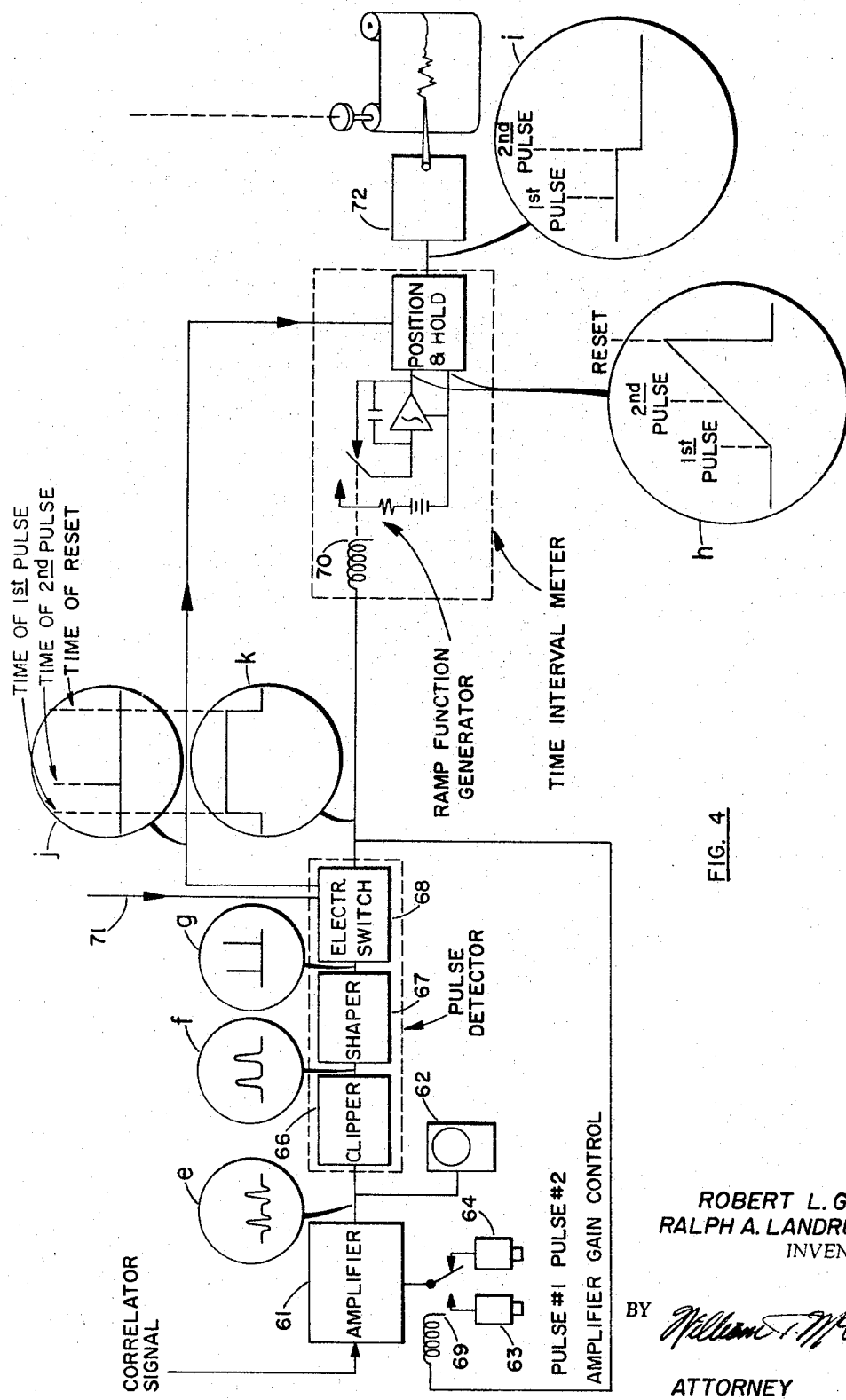

Referring to the accompanying drawings:

FIGURE 1 schematically illustrates an acoustic well logging system employing a magnetic recorder for recording the output from a receiver and correlating the receiver output with the input signal; and FIGURE 1–A is an enlarged view of the magnetic recorder employed in the apparatus of FIGURE 1; and FIGURE 2 is illustrative of typical waveforms of signals utilized in the system of FIGURE 1; and FIGURE 3 schematically illustrates a portion of an acoustic well logging system employing an ultrasonic delay line for correlating the receiver output with the input signal; and FIGURE 4 diagrammatically illustrates an electrical system for handling the correlator output and recording the same.

Briefly, in accordance with the invention, an elastic wave signal is emitted from a transmitter means and transmitted through the surrounding earth media to a receiver means spaced vertically in the borehole from the transmitter. The transmitted signal is correlated with a reference signal, based on the emitted signal, and the correlation signal is employed to determine the transit time between the transmitter means and the receiver means. Preferably, the elastic wave signal is nonrepetitive on its duration, and advantageously is a linear swept frequency signal. A filter device matched with the emitted signal is preferably employed in performing the correlation step.

Typically, a borehole is formed in the earth penetrating a plurality of different formations. The borehole may be substantially filled with liquid, and may be an open hole or provided with a casing. Suspended in the borehole is an acoustical logging tool, or sonde. The sonde is suspended by a multiconductor cable which passes upwardly to the surface and over a sheave and a cable measuring drum employed to indicate the amount of cable paid out so that the vertical location of the sonde in the borehole is known. Typically, the cable measuring drum drives a depth indicator which is also connected to an indicating device, such as a recorder or the like, for displaying signals from the sonde.

The sonde comprises a transmitter means, which may be one or more transducer crystals for emitting acoustic or elastic pulses or waves having ultrasonic frequencies. The elastic waves produced by the transmitter means pass into the earth media surrounding the sonde and travel through this media to a receiver means which also may be one or more transducer crystals vertically spaced along the sonde at a known distance from the transmitter means and acoustically insulated therefrom. A signal generator for driving the transmitter means advantageously is employed downhole, in the sonde, to reduce undue distortion of the signal. However, the signal generator may be employed at the surface, if desired. As described hereinafter, the signal generator is connected to the transmitter means to cause a linear swept frequency elastic wave signal to be applied to the surrounding formation and transmitted to the receiver means.

The receiver means detects the transmitted signal, and the output signal from the receiver is passed through the cable upwardly to the surface where it is suitably amplified and passed to the correlation equipment. Similarly, a counterpart of the signal emitted by the transmitter means, and employed as a reference signal, is passed to the correlation equipment where it is correlated with the receiver output signal to permit identification of the transmitted signal in order to accurately determine the transit time between the transmitter means and the receiver means. Advantageously, the output signal from the correlation equipment is passed to an electronic switching means connected to a recorder so that upon receiving one set of signals the recorder is turned on and upon receiving another set of signals the recorder is turned off.

In one embodiment of the invention, shown in FIGURES 1 and 1–A, a borehole 10 is formed in the earth 11 and elongated, cylindrical sonde 12 is suspended in the borehole by multiconductor cable 13 from cable drum 14 at the surface. A signal generator 16 comprising a magnetic recording device 17 employing, for example, a rotating disc having a magnetizable surface is positioned in the sonde and is driven by a constant speed drive, such as synchronous motor 18, which preferably may be driven at two or more selected speeds. For example, motor 18 may be a two-speed synchronous motor which may operate at 60 or 120 r.p.m., as desired. Electric power to drive motor 18 is supplied from a power source (not shown) which may be located at the surface and connected to the sonde by cable 13. Positioned adjacent the rotating surface of recorder 17 is a reproduce head 19 which picks off the disc a magnetic signal and produces a voltage which is employed to drive two spaced-apart transmitters 21 and 22 located in the sonde and connected to head 19 by electrical conductor 19a. Reproduce head 19 may be connected to an amplifier which suitably amplifies the voltage for driving the transmitters 21 and 22 connected to the amplifier. Suitable acoustical insulation 20 is employed between transmitters 21 and 22 and between the transmitters and receiver 24.

The magnetic signal recorded on the disc may be preprinted, i.e., it may be recorded on the surface of the rotating disc prior to the time the sonde is placed in the borehole, and a number of signals may be recorded on the surface of the disc. Alternatively, if desired, recording head 23 may be employed in conjunction with the rotating disc, and the magnetic signal may be recorded on the magnetic disc by electric signals passed by a conductor 23a of cable 13 from a signal generator at the surface.

The elastic wave signal emitted from the transmitter means preferably is a unique signal which is not repetitive over its duration. Advantageously, a linear swept frequency signal is employed. For example, when motor 18 is operated at 60 r.p.m. the frequency range may be about 10–20 kc.s., and when operated at 120 r.p.m. the emitted signal frequency is about 20–40 kc.s. The duration of the emitted signal typically may be about 100 milliseconds when motor 18 is operated at 60 r.p.m. and the signal is repeated at 100 millisecond intervals to provide five signals per second. Of course, when motor 18 operates at 120 r.p.m. the signal duration and spacing will be shortened and there will be ten signals emitted per second. If it is desired to change the emitted signal while the sonde is in the hole, an erase voltage may be sent down cable 13 from a suitable means at the surface to recorder head 19 to remove the recorded magnetic signal on the rotating disc, and a record head 23 electrically connected by cable 13 to a signal generator at the surface may be used to record another signal on the disc at either 60 or 120 r.p.m., as desired. The feature of a variable signal is important in obtaining the optimum frequency for the particular geologic formation being logged. Also, it permits determining formation velocities in cased holes, which is otherwise difficult. There is a significant difference in the frequencies of signals transmitted by the casing and the formation. For example the formation signal frequency is usually about 40 kilocycles per second, while the casing signal frequency is about 15 kilocycles per second. Thus, as mentioned above, the desired frequency of the emitted signal may be selected merely by varying the speed of motor 18.

The elastic wave signals typically are generated simultaneously by each of the transmitters 21 and 22 and travel through the surrounding formation via wave path 25 to the receiver 24 which is actuated by the transmitted waves to provide an electrical output in response to the acoustic waves detected thereby. It is seen that the signals from the transmitters will arrive at the receiver at different times due to the difference in the length of the travel path for each of the signals. The receiver output signals are passed upwardly to the surface by an electrical conductor in multiconductor cable 13 to a suitable amplifier 26, and a gain control device 27 may be employed to adjust the sensitivity of the receiver. The amplifier receiver output signals then are passed by electrical lead 28 to a recording head 29 for recording the received signals on a magnetizable track of a magnetic recording drum 31 which is rotated by constant speed motor 32 in synchronism with the rotating disc of the signal generator, by conventional means. Motor 32, of course, may be provided with a switch means to vary its speed in accordance with the speed of motor 18 and means are well known in this art for synchronizing the rotation of the two motors. Spaced around drum 31 from the recording head is an erase head 33 for erasing the signals recorded on drum 31 at the proper time. Adjacent the drum recorder is an elongated magnetic correlator head 34 bearing a linear conductor having a configuration corresponding to the waveform of the emitted signal produced by the transmitters and cooperating with the recorded magnetic signal on drum 31 to provide an indication of the degree of correlation between the emitted signal and the transmitted signal received by receiver 24. The linear conductor of correlator head 34 is representative of the signal emitted from the transmitters and is employed in correlating the received signal with the input signal originating at the transmitters in the manner described in French Patent No. 1,329,739, granted May 6, 1964. Correlator head 34 comprises a conductive path 35 on an insulating base which is curved to correspond with the curvature of drum 31 and held in contact with the drum. The configuration of conducting path 35 is essentially a graph of the input signal, i.e., a plot of signal amplitude versus time. As drum 31 rotates, the recorded receiver output passes under conductive path 35 and produces a magnetic force field corresponding to the recorded receiver signal. This produces an output voltage in conductive path 35 which is employed as a measure of the degree of correlation between the input signal and the receiver output signal. The output from correlator head 34 is passed by way of electrical conductor 36 to amplifier 37 where it is suitably amplified and employed to drive a pen recorder, as described in detail hereinbelow in connection with FIGURE 4. A suitable gain control device 40 may be employed to adjust the output signal from head 34.

The elastic wave signal emitted from transmitters 21 and 22 typically has a waveform of the type shown by curves $a_{21}$ and $a_{22}$, respectively, of FIGURE 2. If the signals from the transmitters are applied to the earth formation simultaneously the transmitted waves $b_{21}$ and $b_{22}$ will arrive at receiver 24 at different times and may be of different amplitudes, due to the difference in travel paths and any differences in the wave propagation velocities of the surrounding media. Typically, the duration of the signal emitted from the transmitters is longer than the transit time to the receiver. As shown in c of FIGURE 2, the output signal from the receiver will be the result of partially overlapping of the transmitted waves plus the effect of any extraneous noise or signal distortion occasioned by transmission through the earth. When the first arriving transmitted signal, e.g., that emitted from transmitter 21, matches the waveform of conducting path 35, a peak in the correlator output is produced, as shown by curve $d_{21}$, and, similarly, the second arriving transmitted signal from transmitter 22 produces peak $d_{22}$ in the correlator output signal. The time interval between $d_{21}$ and $d_{22}$ is then employed in determining the velocity of the formation surrounding the sonde.

As shown in FIGURE 1, recording drum 31 is coupled to a constant speed motor 32 which is synchronously connected (as indicated by the dashed line) to the rotating magnetic disc in the sonde as mentioned above, and the drive shaft 38 from the drum motor may be provided with a reset cam 39 followed by an arm connected to reset switch 41 electrically connected to pulse detector 43. The first arriving output signal from the correlator is passed to pulse detector 43 which actuates the time interval meter 42. Later, the second arriving correlator signal also is passed to the pulse detector which again actuates the time interval meter and positions the pen 44 of recorder 46 connected to depth drive motor 48 which may also drive cable drum 14.

Alternatively, as shown in FIGURE 3, another advantageous form of matched filter may be employed to correlate the received signal with the emitted signal. As described in connection with FIGURE 1, the sonde may comprise two spaced transmitters 21 and 22, a magnetic recorder 17, and a receiver 24 which are connected by multiconductor cable 13 to suitable amplification and gain control devices as mentioned above. The output signals from the receiver, after amplification, are passed to an ultrasonic dispersive delay line 51 (FIGURE 3) which may be of the type described in the article, "Synthesis of Dispersive Delay Line Characteristics by Thickness Tapering in Ultrasonic Strip Delay Lines," by Arthur H. Fitch, published in the Journal of the Acoustic Society of America, vol. 35, No. 5, May 1963, pages 709–714. Typically, a suitable ultrasonic dispersive delay line is utilized to generate a linear swept frequency signal similar to curve $a_{21}$ and $a_{22}$ of FIGURE 2. The signal-generating ultrasonic delay line is provided with a driving transducer at the input end and a receiving transducer at the output end. A suitable electrical signal is applied to the driving transducer and the receiving transducer is connected to a magnetic recorder and the impulse response of the ultrasonic delay line is magnetically recorded thereon by conventional means. For example, magnetic disc recorder 17, which may be of the type described above in connection with the apparatus of FIGURE 1 may be used to record the impulse response. The time sequence of the recorded impulse response is reversed, for example, by reversing the direction of rotation of the disc and the recorded impulse response is reproduced from the rotating magnetic disc by playback head 19 connected to transmitters 21 and 22, so as to drive the transmitters and cause a linear swept frequency elastic wave signal to be emitted. The dispersed signals transmitted through the media surrounding the sonde are received by receiver 24 which is connected by cable 13 to the amplification, correlating and recording equipment at the surface. The receiver output is suitably amplified and a gain control device may be provided to adjust the sensitivity of receiver 24, as before. The amplified receiver output is then passed by electrical conductor 54 to ultrasonic delay line 51 wherein the received signal is compressed to form essentially one or more sharp spikes (depending upon the number of transmitters), as shown in curves $d_{21}$ and $d_{22}$ of FIGURE 2. Ultrasonic delay line 51 is, of course, matched with the signal-generating ultrasonic delay line, and either the same or different delay lines may be used for the generating and correlating steps. The output from the ultrasonic delay line is then passed to gain control device 50, amplifier 55, pulse detector 56 and time interval meter 57 as before, with the output from the delay line being recorded on the chart of the recorder 58. The metering device 57 is connected to recorder 58 by electrical conductor 59. A reset switch and cam on the drive shaft of the constant speed motor of recorder 17 are connected by conductor 61 to the pulse detector 56 so that the recorder may be reset by the rotation of the magnetic disc 17 in a manner similar to that described above in connection with the apparatus of FIGURE 1.

Referring now to FIGURE 4, the output signal from the correlator device, e.g., the output from head 34 of FIGURE 1 or the output from ultrasonic delay line 51 of FIGURE 3, is passed by an appropriate electrical conductor to a suitable amplifier 61. Where two transmitters are employed, as mentioned above, the correlator output signal will contain two pulses, which after passing through amplifier 61 have a waveform represented by curve $e$. Monitoring oscilloscope 62 may be employed to monitor the amplified correlator output, and amplifier gain controls 63 and 64 may be used to equalize the amplitudes of the two pulses.

The amplified correlator output is then passed to a pulse detector, comprising a clipper 66, shaper 67 and electronic switch 68, to generate a positive spike of voltage corresponding to the leading edge of the positive excursion of each of the pulses. The clipper, which is a well-known device, retains only the upper portion of the two pulses, the resulting waveform corresponding to the curve $f$. The shaper, also a well-known device, produces the two sharp spikes, as represented by curve $g$, which trigger the electronic switch. The electronic switch in turn actuates a time interval meter which measures the interval of time between the spikes, and also operates a relay 69 of the amplifier gain control circuit so that the two pulses from the correlator will appear at the output of amplifier 61 with the same amplitude.

Electronic switch 68 initiates the generation of a ramp function in the time interval meter at a time corresponding to the arrival time of the first spike formed in the pulse detector. At this time relay 70 is actuated, as well as relay 69. The ramp function voltage then rises, as shown in curve $h$, until an electrical signal is passed by conductor 71 from the reset switch actuated by the cam on the recorder shaft, at which time the voltage drops back to normal. At a time corresponding to the arrival of the second spike formed in the pulse detector, electronic switch 68 commands the time interval meter to sample the value of the ramp function voltage and causes that voltage value to appear at the input to pen recorder 72. The input voltage to the recorder remains at that value, as shown in curve $i$, until the second spike of the next succeeding pulse cycle causes the electronic switch to command a new voltage sample.

FIGURE 4 shows the apparatus immediately after the reset switch has been actuated. When the signals from the transmitters are received and correlated, the first pulse from the correlator is passed to amplifier 61 and relay 69 is in the position shown, at which time the operator may adjust the amplitude of the amplified pulse by turning the knob on gain control 64. The first pulse is clipped and shaped and the resulting first spike triggers electronic switch 68 to initiate the generation of the ramp function voltage (see curve $h$) and the relay control voltage rises as shown in curve $k$. The input voltage to the pen recorder then is unchanged as shown in curve $i$, and the position and hold voltage is as shown in curve $j$. The second pulse from the correlator then arrives, is amplified, clipped and shaped to produce the second spike which triggers electronic switch 68 to actuate the position-andhold circuit in the time interval meter. The ramp function voltage is then sampled and held, the voltage to the pen recorder is as shown in curve $i$. Later, the reset switch is actuated, the relay control voltage (curve $k$) drops to normal so that relays 69 and 70 are deactivated, and another cycle begins. As the pulse cycles are repeated the sonde may traverse the borehole and the record made by the pen recorder is then employed in determining the acoustical characteristics of the media surrounding the sonde.

While the above description refers to the use of an ultrasonic dispersive delay line for performing the correlation between the input signal and the received signal, it is apparent that other compression filters, such as those of the type employed in modern "chirp" radar techniques, may be employed in lieu of the ultrasonic dispersive delay line. For example, such pulse compression systems are described in U.S. Patents 2,678,997 and 2,624,876. Similarly, either magnetic or lumped inductance-capacitance electrical delay lines may be employed to perform the signal correlations if designed in accordance with the signal emitted by the transmitters.

From the foregoing description of preferred embodiments of the present invention various modifications falling within the spirit and scope of the appended claims may become apparent to the artisan. For example, additional transmitters and receivers may be employed to obtain balanced forward and reverse "refraction" profiles along the borehole. Or, separate magnetic tracks may be employed on the disc of recorder 17 to send two different input signals simultaneously from the transmitters, e.g., a high-frequency signal and a low-frequency signal may be sent simultaneously. Of course, appropriate matched filters are employed for each signal.

We claim:
1. Acoustic well logging apparatus comprising an elongated tool adapted to be passed through a borehole; elastic wave signal transmitter means positioned on said tool; elastic wave signal receiver means on said tool spaced along the length thereof from said transmitter means for receiving elastic wave signals traveling through the surrounding media from said transmitter means and for producing an output signal in response to received elastic wave signals; signal generator means connected to said transmitter means for driving said transmitter means; correlator means connected to said receiver means for receiving the output therefrom and for correlating the transmitted signal with a signal emitted from said transmitter means; pulse detecting means connected to said correlator means for receiving the correlator output; time interval metering means connected to said pulse detecting means; and recorder means connected to said metering means for providing a record of the time interval between signal pulses transmitted to said receiver means.

2. The apparatus of claim 1 wherein said correlator means comprises a second magnetic recorder and an elongated magnetic recorder head bearing a linear conductor having a configuration corresponding to the waveform of signals emitted from said transmitter means.

3. The apparatus of claim 1 wherein said correlator means comprises an ultrasonic delay line having characteristics matched with the signals emitted from said transmitter means.

4. The apparatus of claim 1 wherein said transmitter means comprises signal generating means; two spaced transducers; means connecting said signal generating means to each said transducers for simultaneously exciting said transducers by the signal from said signal generating means.

5. The apparatus of claim 1 wherein said signal generator means is adapted to produce a linear sweps frequency signal from said transmitter means.

6. Acoustic well logging apparatus comprising:
an elongated tool adapted to be passed through a borehole;
signal generating means having a signal;
two spaced apart signal transducers on said tool;
means connecting the signal from said signal generating means to each said transducer including means such that each said transducer is simultaneously excited by said signal;
elastic wave signal receiver means spaced along the length of said tool from said transducers for receiving elastic wave signals traveling through the surrounding media from said transducers and for producing an output signal in response to received elastic wave signals;
and correlator means connected to said receiver means for receiving the output therefrom and for correlating the transmitted signal with the received signal.

7. The apparatus of claim 6 wherein said correlator means comprises a filter means matched with said signal of said signal generating means.

8. The aparatus of claim 6, further including means for generating a signal in the frequency range from about 10 to about 40 kilocycles per second.

9. An apparatus as defined in claim 6, further including pulse detecting means connected to said correlator means for receiving the output therefrom; time interval metering means connected to said pulse detecting means; and indicating means connected to said metering means for displaying the output of said logging apparatus.

References Cited by the Examiner

UNITED STATES PATENTS

| | | | |
|---|---|---|---|
| 2,275,736 | 3/1942 | Cloud | 181—.5 |
| 2,989,720 | 6/1961 | Crawford et al. | 340—15.5 |
| 3,158,830 | 11/1964 | Clay | 340—15.5 |
| 3,174,142 | 3/1965 | Mallinckrodt | 340—15.5 |
| 3,182,285 | 5/1965 | Vogel | 181—.5 |
| 3,209,322 | 9/1965 | Doty | 181—.5 |

FOREIGN PATENTS 1,329,739  5/1963  France.

BENJAMIN A. BORCHELT, *Primary Examiner.*

SAMUEL FEINBERG, *Examiner.*

R. M. SKOLNIK, *Assistant Examiner.*